United States Patent
Yasunaga et al.

(10) Patent No.: US 9,399,388 B2
(45) Date of Patent: Jul. 26, 2016

(54) GUIDE-PULLEY DEVICE AND VEHICLE SLIDING DOOR SYSTEM

(71) Applicant: AISIN SEIKI KABUSHIKI KAISHA, Kariya-shi (JP)

(72) Inventors: Tetsuya Yasunaga, Anjo (JP); Kazuo Kojima, Takahama (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/768,996

(22) PCT Filed: Feb. 17, 2014

(86) PCT No.: PCT/JP2014/053615
§ 371 (c)(1),
(2) Date: Aug. 19, 2015

(87) PCT Pub. No.: WO2014/129420
PCT Pub. Date: Aug. 28, 2014

(65) Prior Publication Data
US 2016/0001641 A1    Jan. 7, 2016

(30) Foreign Application Priority Data

Feb. 22, 2013   (JP) .................................. 2013-033010

(51) Int. Cl.
*E05F 11/00*    (2006.01)
*B60J 5/04*    (2006.01)
(Continued)

(52) U.S. Cl.
CPC .. *B60J 5/047* (2013.01); *B60J 5/06* (2013.01); *E05F 11/54* (2013.01); *E05F 15/643* (2015.01);
(Continued)

(58) Field of Classification Search
CPC ............. B60J 5/047; B60J 5/06; E05F 11/54; E05F 15/643; E05F 15/646; E05Y 2900/531

USPC ............................................ 49/360; 296/155
See application file for complete search history.

(56) References Cited

U.S. PATENT DOCUMENTS 8,857,104 B2 * 10/2014 Ishigaki et al. ................. 49/360
2008/0000161 A1 * 1/2008 Nagai et al. ..................... 49/360
(Continued)

FOREIGN PATENT DOCUMENTS

| JP | 2003-82927 A | 3/2003 |
|---|---|---|
| JP | 2008-303545 A | 12/2008 |
| JP | 2009-24422 A | 2/2009 |

OTHER PUBLICATIONS

International Search Report Issued Apr. 15, 2014 in PCT/JP14/053615 Filed Feb. 17, 2014.
International Preliminary Report on Patentability and Written Opinion issued Aug. 25, 2015 in PCT/JP2014/053615 filed Feb. 17, 2014 (submitting English translation only).

*Primary Examiner* — Jerry Redman
(74) *Attorney, Agent, or Firm* — Oblon, McClelland, Maier & Neustadt, L.L.P

(57) ABSTRACT

A guide-pulley device is equipped with: a guide pulley having a plurality of grooves configured so as to independently accommodate two cables for moving in a manner such that when one moves in a winding direction, the other moves in a feeding direction; and a storage body for storing the guide pulley. The storage body has first and second storage members which attach to one another. The first storage member has a base on which a support shaft for supporting the guide pulley stands upright. The second storage member has a lid section which faces the base section. The first storage member also has a partition wall for forming two routing channels for routing each of the cables, and a plurality of hooks projecting from the partition into the grooves. The base, the partition wall, and the hooks are formed integrally.

8 Claims, 6 Drawing Sheets

(51) Int. Cl.
*B60J 5/06* (2006.01)
*E05F 15/646* (2015.01)
*E05F 15/643* (2015.01)
*E05F 11/54* (2006.01)
*E05D 15/10* (2006.01)

(52) U.S. Cl.
CPC ....... *E05F 15/646* (2015.01); *E05D 2015/1055* (2013.01); *E05Y 2201/66* (2013.01); *E05Y 2201/668* (2013.01); *E05Y 2900/531* (2013.01)

(56) References Cited

U.S. PATENT DOCUMENTS

2008/0036317 A1* 2/2008 Miyagawa et al. ............. 310/83
2008/0302018 A1  12/2008 Yamada et al.
2009/0019776 A1   1/2009 Ohtaki et al.

* cited by examiner

GUIDE-PULLEY DEVICE AND VEHICLE SLIDING DOOR SYSTEM

TECHNICAL FIELD

The present invention relates to a guide pulley device, and to a vehicle sliding door system.

BACKGROUND ART

Generally, a sliding door that opens and closes a door opening of a vehicle is supported by slide rails, which are arranged in the vehicle body, to be movable in the front-rear direction of the vehicle. Further, a sliding door system may include two drive cables. An end of one of the drive cables is fixed to the vehicle body near the front end of the slide rail, and an end of the other drive cable is fixed to the vehicle body near the rear end of the slide rail. A drum device, which is arranged in the sliding door, winds one of the drive cables and unwinds the other drive cable. This opens and closes the sliding door.

For example, Patent Document 1 describes a sliding door system in which a guide pulley is located at the connection section between a sliding door and a slide rail. The guide pulley includes a plurality of separate grooves around which two drive cables are wound. The two drive cables are routed in opposite directions along the slide rail, which extends in the vehicle front-rear direction.

More specifically, the sliding door system includes a guide pulley device that includes first and second guide pulleys around which the respective drive cables are wound. In the guide pulley device, the first guide pulley is formed by one pulley that includes separate grooves, which are arranged in two tiers. The second guide pulley is formed by two separate pulleys, which are coaxially arranged. The guide pulley device further includes a receptacle that accommodates the first and second guide pulleys. The guide pulley device is fixed to a support arm of a guide roller unit, which connects the sliding door and the slide rail, such that the first guide pulley is closer to the vehicle body and the second guide pulley is closer to the sliding door.

In the guide pulley device, the receptacle is formed by coupling a first accommodation member and a second accommodation member together. The first accommodation member includes a base from which support shafts that support the guide pulleys project. The second accommodation member includes a lid that faces the base of the first accommodation member. Partitions and protectors are arranged between the first and second accommodation members. The partitions form routing passages in the receptacle. The routing passages are associated with the respective drive cables. The protectors are hooks that protrude into the grooves of the first and second guide pulleys to remove foreign matter, such as ice, that adheres to the grooves.

PRIOR ART DOCUMENTS

Patent Documents

Patent Document 1: Japanese Laid-Open Patent Publication No. 2008-303545

SUMMARY OF THE INVENTION

Problems that the Invention is to Solve

The conventional guide pulley device described above has a complicated structure and is thus difficult to assemble, which results in higher manufacturing costs. Further improvements are needed in this regard.

It is an objective of the present invention to provide a guide pulley device that has a simple structure and is easy to assemble and a vehicle sliding door system including the guide pulley device.

Means for Solving the Problems

To solve the foregoing problem, a guide pulley device includes: a guide pulley including a plurality of grooves, wherein the grooves are configured such that two cables are separately received by the grooves, and one of the cables moves in a winding direction when the other one of the cables moves in an unwinding direction; and a receptacle that accommodates the guide pulley. The receptacle includes a first accommodation member and a second accommodation member that are coupled to each other. The first accommodation member includes a base from which a support shaft that supports the guide pulley projects. The second accommodation member includes a lid that faces the base. The first accommodation member includes a partition wall, which forms two routing passages for individually routing the cables, and a plurality of hooks protruding from the partition wall into the grooves. The base, the partition wall, and the hooks are formed integrally.

MODES FOR CARRYING OUT THE INVENTION

Referring to drawings, one embodiment of a guide pulley device in a vehicle sliding door system will now be described.

Figure 1:
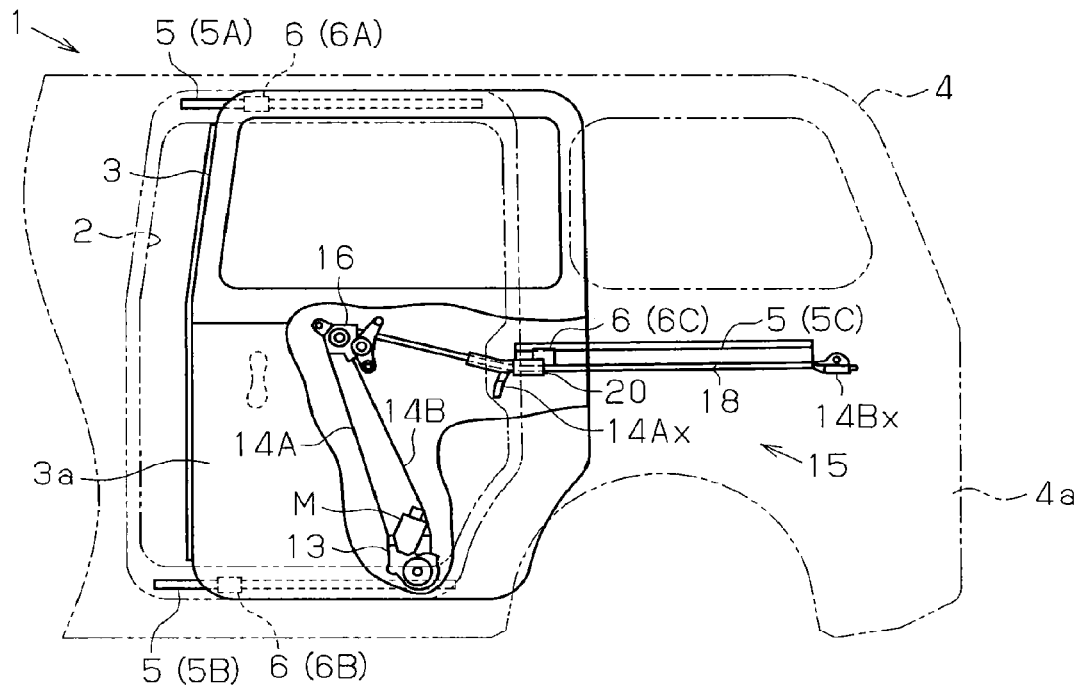
FIG. 1 is a schematic view showing a vehicle sliding door system.

As shown in FIG. 1, a sliding door 3 that opens and closes a door opening 2 of a vehicle 1 is supported by slide rails 5 that are located on a side surface 4a of a vehicle body 4. The sliding door 3 is movable in the front-rear direction of the vehicle 1.

The vehicle 1 includes an upper rail 5A and a lower rail 5B, which are located on the upper edge and the lower edge of the door opening 2, respectively. The upper rail 5A and the lower rail 5B extend in the vehicle front-rear direction. The vehicle 1 also includes a center rail 5C, which extends in the vehicle front-rear direction behind the door opening 2. The sliding door 3 is coupled to the slide rails 5 by guide roller units 6 to be movable in the extending direction of the slide rails 5.

Figure 2:
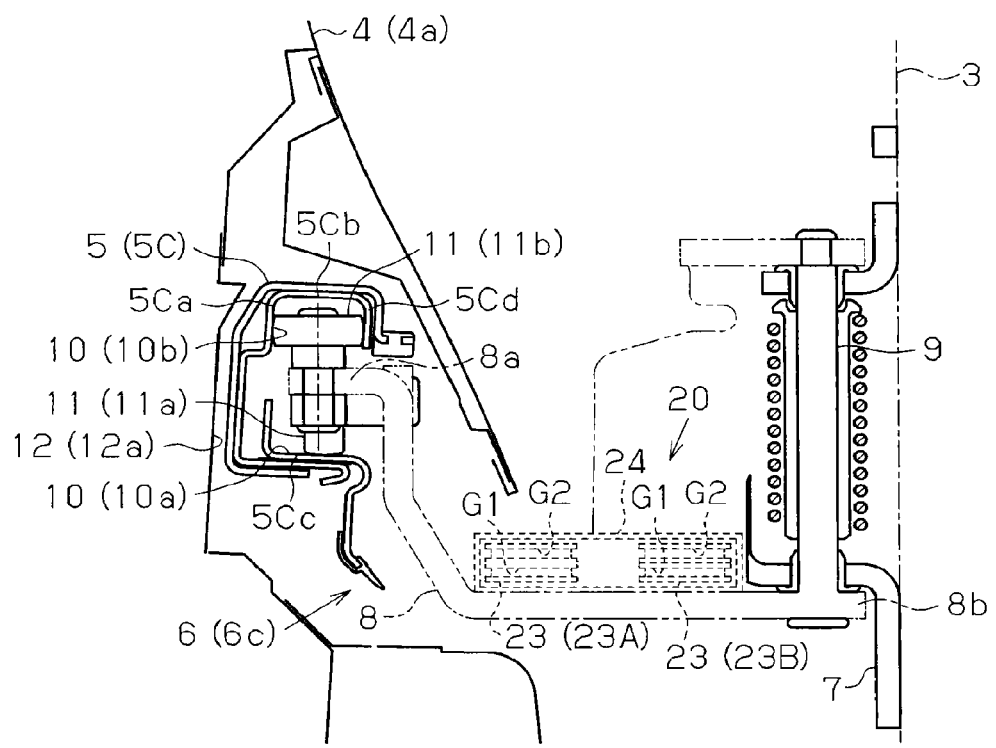
FIG. 2 is a schematic view showing a guide roller unit of the vehicle sliding door system of FIG. 1.

More specifically, as shown in FIG. 2, a guide roller unit 6C is coupled to the center rail 5C. The guide roller unit 6C includes a bracket 7, which is fixed to the sliding door 3, and a support arm 8, which is rotationally supported by the bracket 7. The support arm 8 includes a support shaft 9 that extends in the vertical direction. The support arm 8 includes a distal end 8a on which a plurality of rollers 11 are located. The center rail 5C includes roller guides 10 that guide the rollers 11.

The side surface 4a of the vehicle body 4 includes a recess 12 behind the door opening 2. The recess 12 has the shape of a groove extending in the vehicle front-rear direction. The center rail 5C is located in the recess 12 and substantially has a U-shaped cross-section that opens toward the outside of the vehicle (rightward as viewed in FIG. 2).

Specifically, the center rail 5C includes a side wall 5Ca, which extends along a bottom surface 12a of the recess 12 in the vehicle front-rear direction, and an upper wall 5Cb and a lower wall 5Cc, which extend from the upper end and the lower end of the side wall 5Ca toward the outside of the vehicle and in parallel to each other. The center rail 5C also includes an outer wall 5Cd, which extends downward from an end in the width direction of the upper wall 5Cb and faces the side wall 5Ca. In the present embodiment, the upper wall 5Cb and the lower wall 5Cc, which face each other, form a first roller guide 10a, and the side wall 5Ca and the outer wall 5Cd, which face each other, form a second roller guide 10b.

A load-bearing roller 11a, which is located in the first roller guide 10a, and a vertical roller 11b, which is located in the second roller guide 10b, are arranged on the distal end 8a of the support arm 8. The load-bearing roller 11a has a wheel diameter that is larger than the gap between the lower end of the outer wall 5Cd and the end of the lower wall 5Cc that faces toward the outside of the vehicle. The vertical roller 11b has a wheel diameter that is slightly smaller than the gap between the side wall 5Ca and the outer wall 5Cd, which form the second roller guide 10b.

Accordingly, the guide roller unit 6C of the present embodiment is coupled to the center rail 5C in a nonremovable manner with the rollers 11 (11a and 11b) in contact with the walls 5Ca to 5Cd, which form the roller guides 10 (10a and 10b). Rotational movements of the rollers 11 (11a and 11b) on the walls (5Ca to 5Cd) of the center rail 5C allow the guide roller unit 6C to move in the extending direction of the center rail 5C.

The front end of slide rail 5 is slightly curved toward the inside of the vehicle. Thus, when the sliding door 3 is moved toward the front of the vehicle and placed in the fully closed position, an outer panel 3a that forms the body surface of the sliding door 3 is substantially flush with the side surface 4a of the vehicle body 4. When the sliding door 3 is moved toward the rear of the vehicle by an open operation, the outer panel 3a is placed outside the side surface 4a of the vehicle body 4 so as not to interfere with the side surface 4a (FIG. 1).

During an open or close operation of the sliding door 3, the support arm 8 rotates in the guide roller unit 6C about the support shaft 9, which is arranged at the proximal end 8b of the support arm 8, thereby pivoting the sliding door 3, which is supported by the guide roller unit 6C. This ensures smooth movements in the front-rear direction of the sliding door 3, that is, open and close operation of the sliding door 3.

In the present embodiment, the guide roller units 6A and 6B, which are coupled to the upper rail 5A and the lower rail 5B, substantially have the same structure as the guide roller unit 6C coupled to the center rail 5C. Thus, the guide roller units 6A and 6B will not be described in detail.

As shown in FIG. 1, a drum device 13, which rotates when driven by a motor M, is located in the sliding door 3. The drum device 13 is connected to first and second drive cables 14A and 14B. Rotation of the drum device 13 winds one of the first and second cables 14A and 14B and unwinds the other. The first drive cable 14A has an end 14Ax that is fixed to the vehicle body 4 near the front end of the center rail 5C. The second drive cable 14B has an end 14Bx that is fixed to the vehicle body 4 near the rear end of the center rail 5C. This forms a sliding door system 15 that opens and closes the sliding door 3 using the motor M as the power source.

More specifically, the first and second drive cables 14A and 14B pass through a relay pulley 16 and extend out of the sliding door 3 near the guide roller unit 6C, which is coupled to the center rail 5C. A guide pulley device 20 is arranged in the guide roller unit 6C. The first and second drive cables 14A and 14B extend from the sliding door 3 to the vehicle body 4 via the guide pulley device 20.

A cable guide 18 extends in the extending direction of the center rail 5C at the lower edge of the center rail 5C. The first and second drive cables 14A and 14B are guided by the cable guide 18 to extend along the center rail 5C, which extends in the vehicle front-rear direction.

More specifically, the first drive cable 14A extends in the cable guide 18 from the rear side to the front side of the vehicle (from right to left as viewed in FIG. 1). The second drive cable 14B extends from the front side to the rear side of the vehicle (from left to right as viewed in FIG. 1). The end 14Ax of the first drive cable 14A is fixed to the vehicle body 4 near the front end of the center rail 5C. The end 14Bx of the second drive cable 14B is fixed to the vehicle body 4 near the rear end of the center rail 5C.

The sliding door system 15 moves the sliding door 3 toward the front of the vehicle, that is, performs a close operation, by winding the first drive cable 14A and simultaneously unwinding the second drive cable 14B using the drum device 13. The sliding door system 15 moves the sliding door 3 toward the rear of the vehicle, that is, performs an open operation, by winding the second drive cable 14B and simultaneously unwinding the first drive cable 14A. In other words, when the sliding door 3 is opened or closed, one of the first and second drive cables 14A and 14B moved in the winding direction and the other moves in the unwinding direction.

Guide Pulley Device

The structure of the guide pulley device arranged in the sliding door system of the present embodiment will now be described.

As shown in FIGS. 2 to 5, the guide pulley device 20 of the present embodiment includes two guide pulleys 23 and a receptacle 24 that accommodates the guide pulleys 23. Each guide pulley 23 includes a plurality of (two) grooves G1 and G2. Two cables 21 and 22 that form the first and second drive cables 14A and 14B are separately wound around the guide pulleys 23 (FIG. 2). When the drum device 13 winds one of the cables 21 and 22 and unwinds the other, the cables 21 and 22 move substantially in opposite directions in the receptacle 24.

As shown in FIG. 2, in the sliding door system 15, the guide pulley device 20 is fixed to the support arm 8, which is a component of the guide roller unit 6C. The guide pulley device 20 includes a first guide pulley 23A and a second guide pulley 23B. When the guide pulley device 20 is fixed to the support arm 8, the first guide pulley 23A is located between the vehicle body 4 and the second guide pulley 23B (on the left side as viewed in FIG. 2), and the second guide pulley 23B is located between the first guide pulley 23A and the sliding door 3 (on the right side as viewed in FIG. 2)

Figure 3:
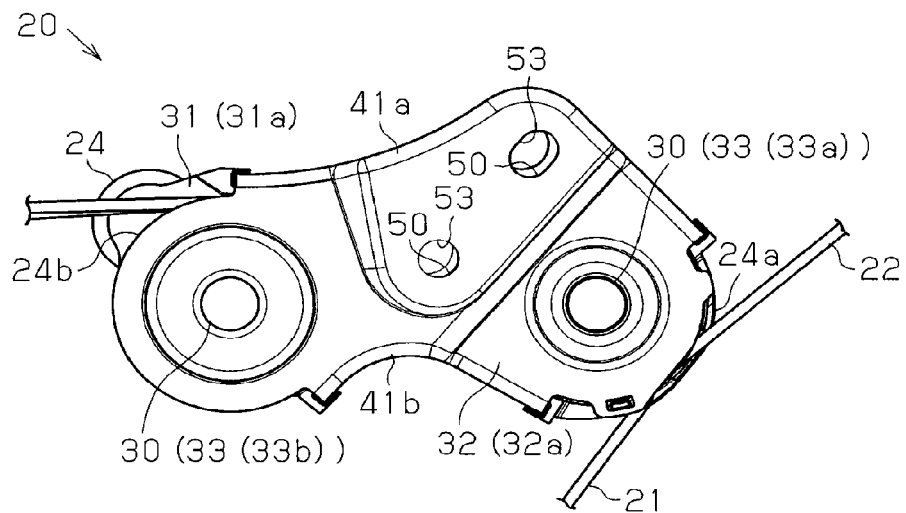
FIG. 3 is a plan view showing a guide pulley device of the guide roller unit of FIG. 2.
Figure 4:
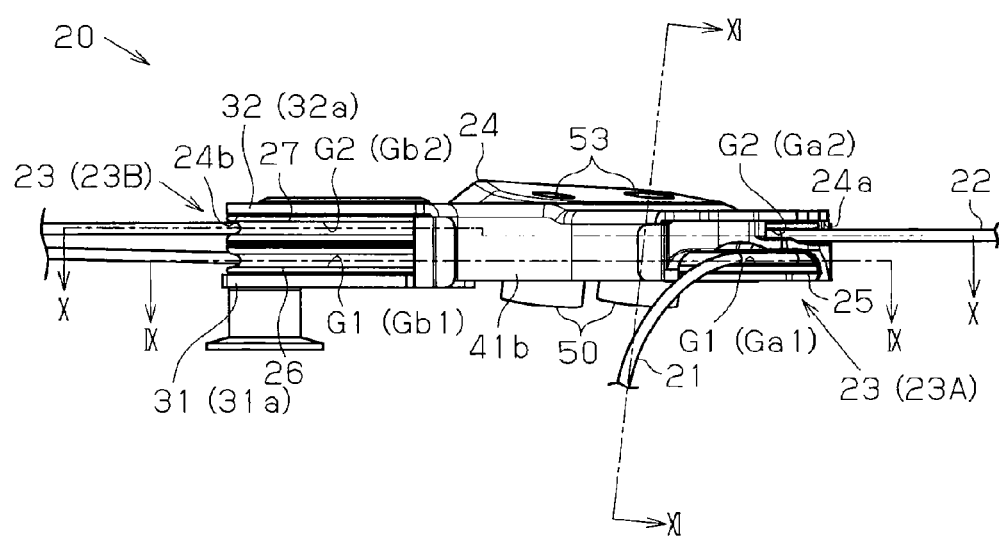
FIG. 4 is a side view showing the guide pulley device of FIG. 3.
Figure 5:
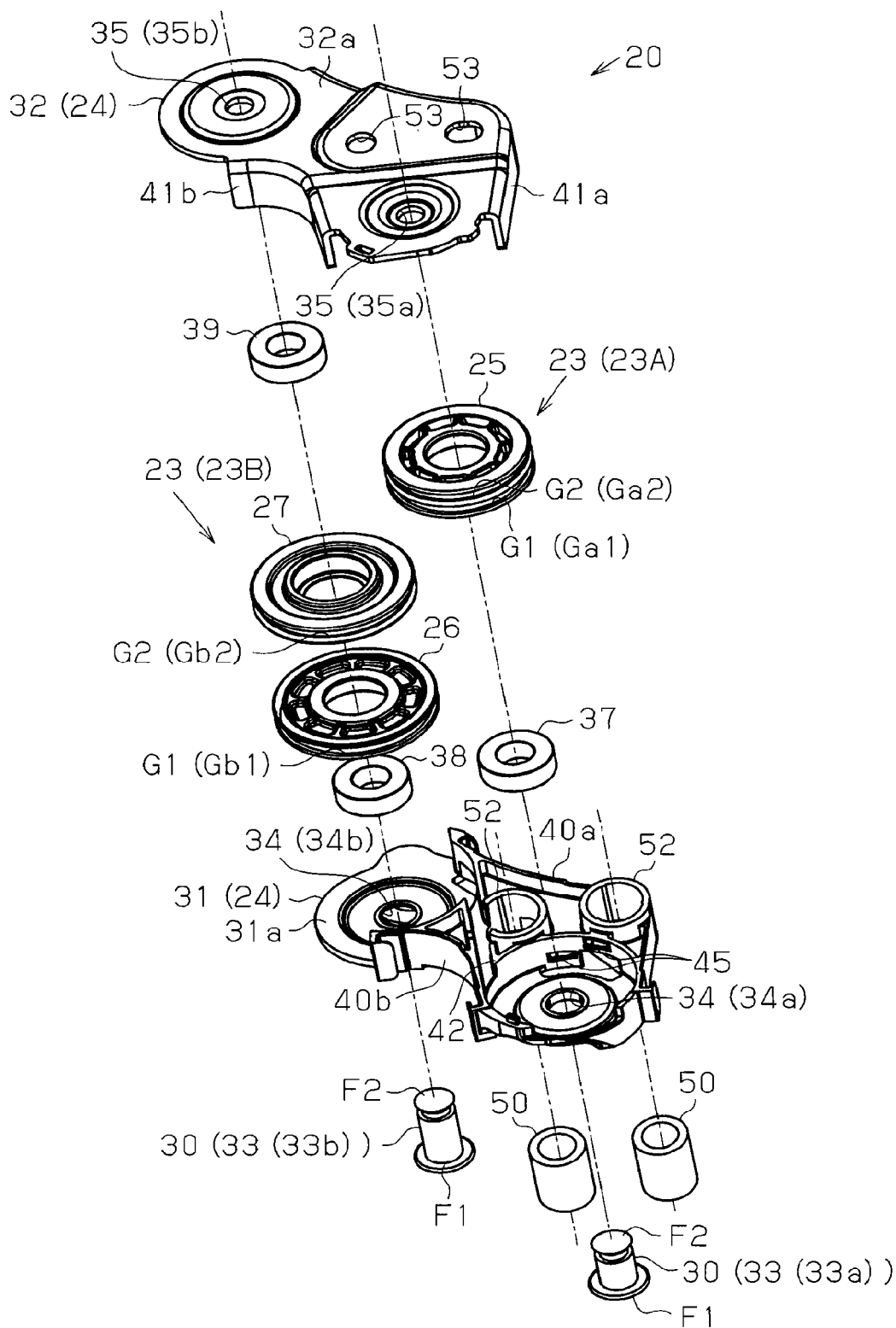
FIG. 5 is an exploded perspective view showing the guide pulley device.

As shown in FIGS. 2, 4 and 5, the first guide pulley 23A is formed by a pulley 25, which includes separate grooves Ga1 and Ga2 that are arranged in two tiers. The second guide pulley 23B is formed by two separate pulleys 26 and 27 that are coaxially arranged. As shown in FIG. 3, the two cables 21 and 22 are wound around the first and second guide pulleys 23A and 23B substantially in a figure of six.

As shown in FIGS. 4 and 5, the receptacle 24 is formed by coupling a plastic plate 31, which has a flat base 31a, to a metal housing 32, which has a flat lid 32a that faces the base 31a. Support shafts 30 project from the base 31a of the plastic plate 31 to support the guide pulleys 23.

Figure 6:
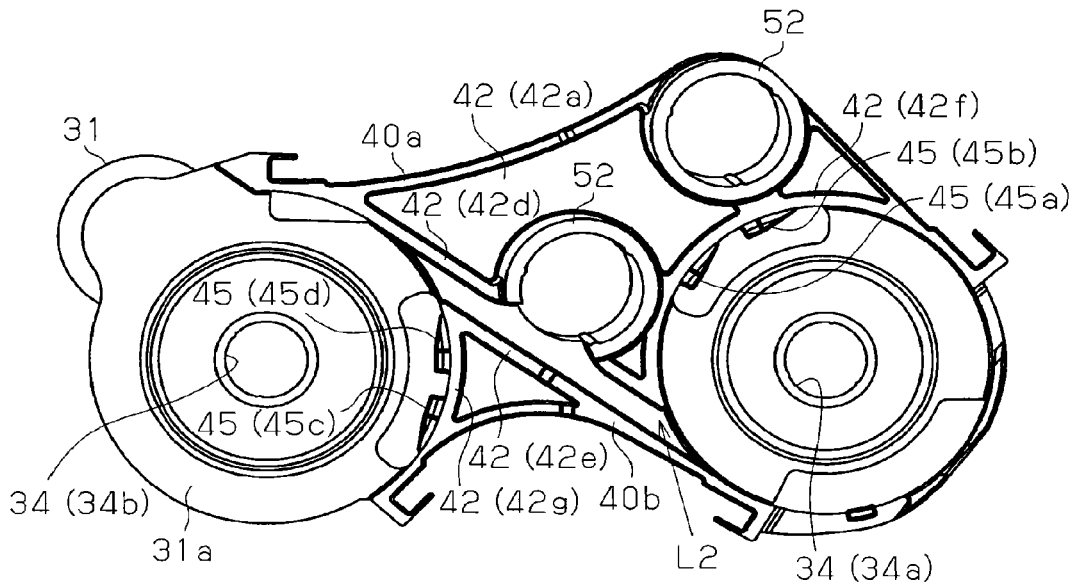
FIG. 6 is a plan view of a plastic plate.
Figure 7:
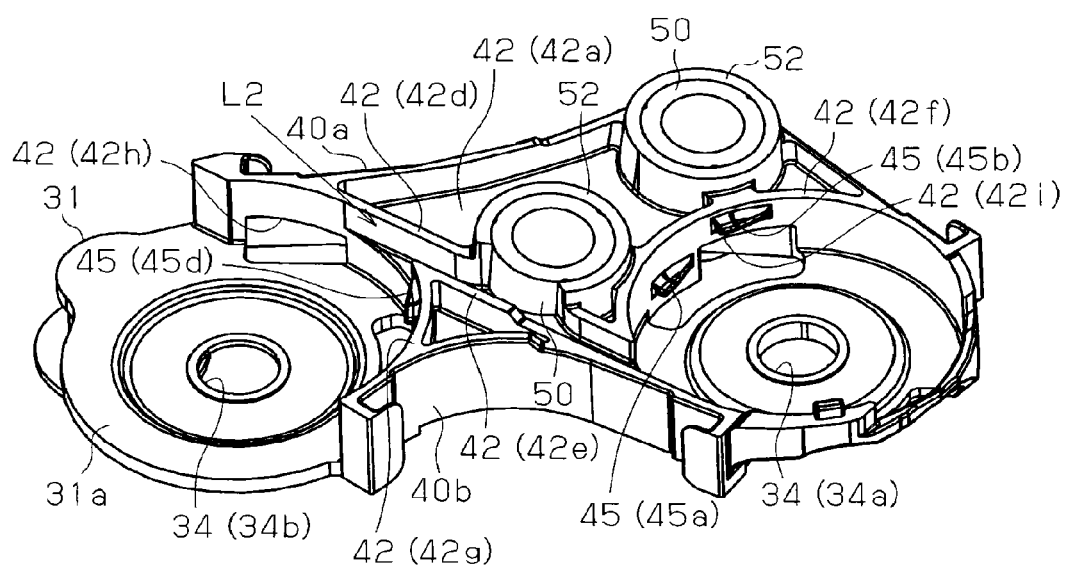
FIG. 7 is a perspective view of the plastic plate.

As shown in FIGS. 5 to 7, the base 31a of the plastic plate 31 and the lid 32a of the metal housing 32 include through holes 34 and 35, which receive pins 33 that function as rivets that fasten the plastic plate 31 and the metal housing 32 together. Specifically, the base 31a of the plastic plate 31 includes a pair of through holes 34a and 34b through which two pins 33a and 33b are inserted. The lid 32a of the metal housing 32 includes a pair of through holes 35a and 35b that faces the through holes 34a and 34b. The pins 33a and 33b, which function as the support shafts 30, rotationally support the first and second guide pulleys 23A and 23B, respectively.

Figure 8:
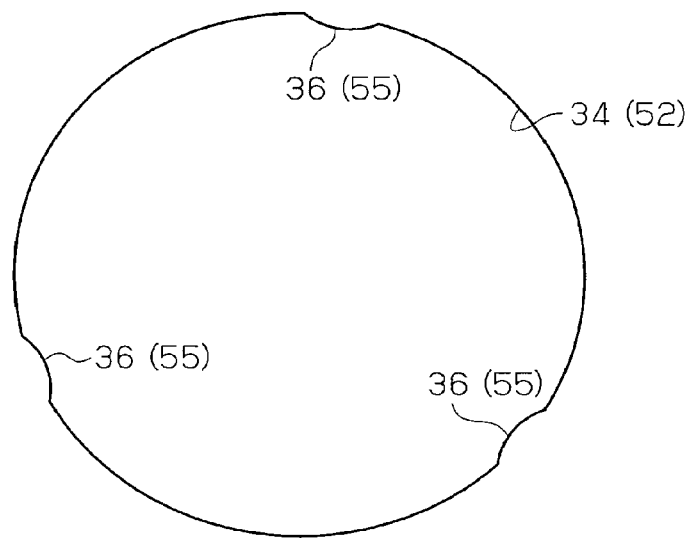
FIG. 8 is a schematic view showing protrusions arranged in a through hole (in a tubular portion).

As shown in FIG. 5, the pins 33a and 33b each include a fastening section F1, which has the shape of a flange. The pins 33a and 33b are inserted into the through holes 34a and 34b of the plastic plate 31 in advance such that the fastening sections F1 are in contact with the base 31a. As shown in FIG. 8, the inner surfaces defining the through holes 34 include a plurality of (three in the present embodiment) protrusions 36 that protrude radially inward. The pins 33 are pressed into the respective through holes 34 as flattening the protrusions 36. Thus, the pins 33a and 33b that are inserted through the through holes 34a and 34b of the plastic plate 31 are engaged with the plastic plate 31.

As shown in FIG. 5, the pulley 25, which forms the first guide pulley 23A, is coupled to the pin 33a via a bearing 37. The pulleys 26 and 27, which form the second guide pulley 23B, are coupled to the pin 33b via bearings 38 and 39, respectively.

Further, as shown in FIGS. 5 to 7, the plastic plate 31 includes two side walls 40a and 40b that are located at the edges of the base 31a and extend in the direction in which the through holes 34a and 34b are aligned (right to left direction as viewed in FIG. 5). In addition, as shown in FIG. 5, the metal housing 32 includes two fitting walls 41a and 41b that are located at the edges of the lid 32a and extend in the direction in which the through holes 35a and 35b are aligned. When the metal housing 32 is coupled to the plastic plate 31, the side walls 40a and 40b are fitted into the fitting walls 41a and 41b.

When the metal housing 32 is coupled to the plastic plate 31, fastening sections F2 at the distal ends of the pins 33 (33a and 33b) project out of the through holes 35a and 35b of the metal housing 32. The fastening sections F2 are then deformed so that the plastic plate 31 and the metal housing 32 form the receptacle 24 that accommodates the guide pulleys 23.

As shown in FIGS. 6, 7, 9 and 10, the plastic plate 31 includes partition walls 42 in the receptacle 24. The partition walls 42 define routing passages L1 and L2 that receive the respective cables 21 and 22, which are wound around the first and second guide pulleys 23A and 23B. Specifically, the partition walls 42 are arranged between the first guide pulley 23A and the second guide pulley 23B. The partition walls 42 prevent interference between the two cables 21 and 22, one of which moves in the winding direction while the other moves in the unwinding direction.

More specifically, as shown in FIG. 4, in the guide pulley device 20 of the present embodiment, the first cable 21 is located at a position closer to the base 31a of the plastic plate 31 in the receptacle 24 (on the lower side as viewed in FIG. 4), and the second cable 22 is located at a position closer to the lid 32a of the metal housing 32 (on the upper side as viewed in FIG. 4).

Figure 9:
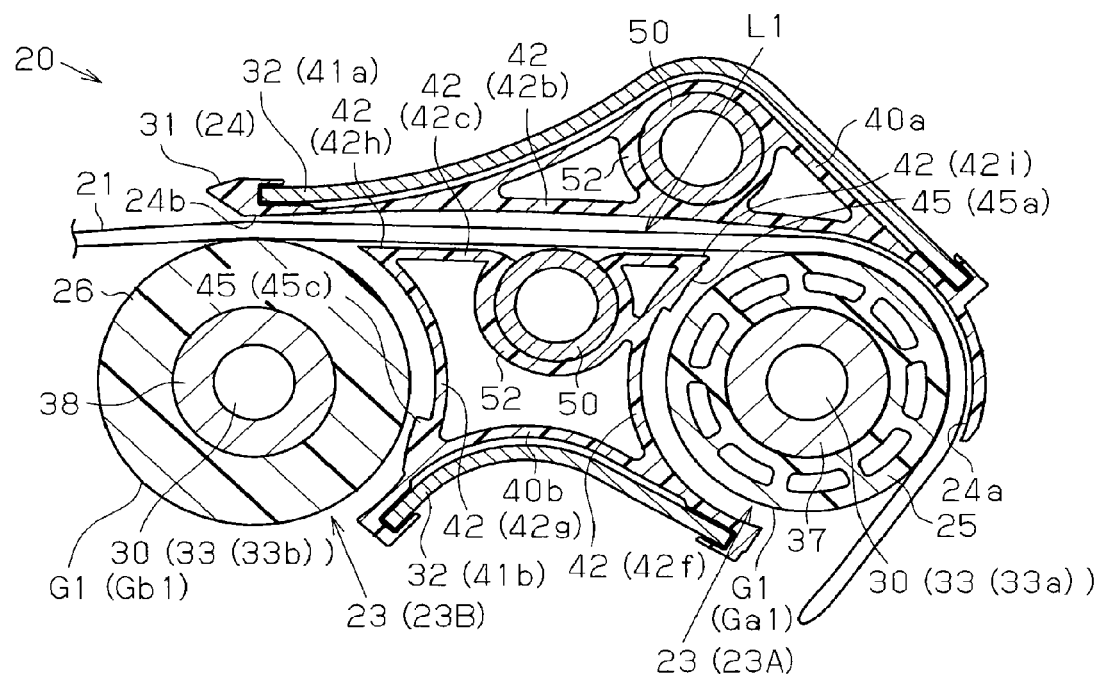
FIG. 9 is a cross-sectional view taken along line IX-IX in FIG. 4.
Figure 10:
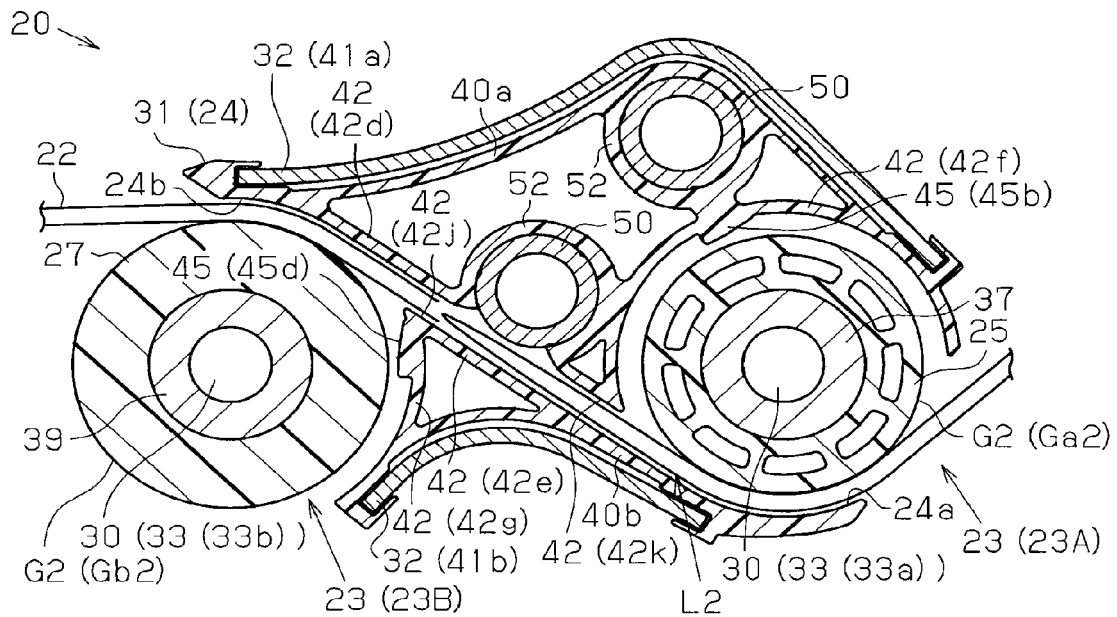
FIG. 10 is a cross-sectional view taken along line X-X in FIG. 4.

As shown in FIGS. 4 and 9, the groove Gb1 of the pulley 26 receives the first cable 21. Of the two pulleys 26 and 27 that form the second guide pulley 23B, the pulley 26 is closer to the base 31a of the plastic plate 31. In addition, in the pulley 25 that forms the first guide pulley 23A, the groove Ga1 that is closer to the base 31a of the plastic plate 31 receives the first cable 21. As shown in FIGS. 4 and 10, the groove Gb2 of the pulley 27, which is closer to the lid 32a of the metal housing 32, and the groove Ga2, which is closer to the lid 32a of the metal housing 32 in the pulley 25 that forms the first guide pulley 23A, receive the second cable 22. As shown in FIGS. 6 and 7, the partition walls 42 include a middle wall 42a that partitions the routing region of the two cables 21 and 22 into a base region that faces the base 31a of the plastic plate 31 and a lid region that faces the lid 32a of the metal housing 32. In other words, the routing passage L1 of the first cable 21 and the routing passage L2 of the second cable 22 are arranged in the axial direction of the support shafts 30.

As shown in FIG. 9, the first cable 21 is routed along the side wall 40a of the plastic plate 31 to be received by the first and second guide pulleys 23A and 23B. That is, the first cable 21 extends between side wall 40a and the first and second guide pulleys 23A and 23B (on the upper side as viewed in FIG. 9). The partition walls 42 include a pair of guide walls 42b and 42c that is located in the base region defined by the middle wall 42a. The guide walls 42b and 42c extend in the direction in which the first cable 21 extends, that is, the direction in which the support shafts 30 of the guide pulleys 23 are aligned.

As shown in FIG. 10, the second cable 22 is routed diagonally from the side wall 40a toward the side wall 40b to be received by the first and second guide pulleys 23A and 23B. More specifically, the second cable 22 extends between the second guide pulley 23B and the side wall 40a (on the upper side as viewed in FIG. 10) and then extends between the first guide pulley 23A and the side wall 40b (on the lower side as viewed in FIG. 10). The partition walls 42 include a pair of guide walls 42d and 42e that is located in the lid region defined by the middle wall 42a. The guide walls 42d and 42e extend in the direction in which the second cable 22 extends, that is, the direction in which the support shafts 30 of the second guide pulley 23 are aligned.

As shown in FIGS. 6, 7, 9 and 10, the partition walls 42 also include circumferential walls 42f and 42g that substantially have the shape of an arc. The circumferential wall 42f is located radially outward of the first guide pulley 23A and faces the groove G1 and G2 (Ga1 and Ga2). The circumferential wall 42g is located radially outward of the second guide pulley 23B and faces the grooves G1 and G2 (Gb1 and Gb2). The circumferential walls 42f and 42g include connection holes 42h and 42i, respectively, that connect to the space between the guide walls 42b and 42c (i.e., the routing passage L1). In addition, the circumferential walls 42f and 42g include connection holes 42k and 42j, respectively, that connect to the space between the guide walls 42d and 42e (i.e., the routing passage L2). The two separate routing passages L1 and L2 that are associated with the respective cables 21 and 22 are thus formed.

As shown in FIGS. 3, 9 and 10, the receptacle 24 includes openings 24a and 24b, which open away from each other in the direction in which the support shafts 30 for the guide pulleys 23 are aligned (right to left direction as viewed in the drawings). The openings 24a and 24b are the sections where the side walls 40a and 40b of the plastic plate 31 or the fitting walls 41a and 41b of the metal housing 32 are not present. The two cables 21 and 22 are wound around the first and second guide pulleys 23A and 23B and extended out of the receptacle 24 through the openings 24a and 24b.

As shown in FIGS. 6, 7, 9 and 10, the circumferential walls 42f and 42g of the partition walls 42 include hooks 45 each protruding into the corresponding one of the grooves G1 and G2 of the opposing guide pulleys 23.

More specifically, the circumferential wall 42f includes two hooks 45a and 45b that respectively protrude into the grooves Ga1 and Ga2 of the pulley 25 that forms the first guide pulley 23A. Further, the circumferential wall 42g includes two hooks 45c and 45d that respectively protrude into the grooves Gb1 and Gb2 of the two pulleys 26 and 27 that form the second guide pulley 23B. The hooks 45 remove foreign matter, such as ice, that adheres to the associated grooves G1 and G2. The hooks 45a to 45d are positioned so as not to overlap one another in the axial direction of the guide pulleys 23.

Figure 11:
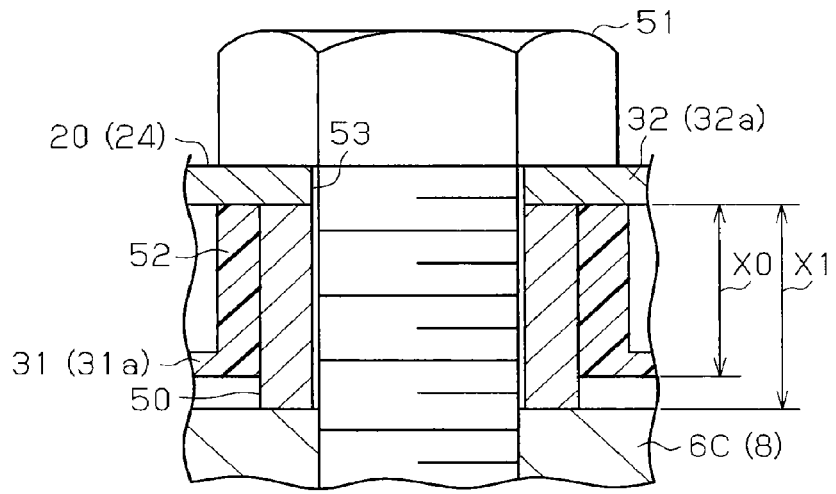
FIG. 11 is a partial cross-sectional view taken along line XI-XI in FIG. 4 and showing fastening by a bolt.

As shown in FIGS. 7 and 11, metal collars 50, which function as metal tubular members, are attached to the plastic plate 31. The guide pulley device 20 is fixed on the support arm 8 of the guide roller unit 6C by the tightening force of bolts 51 that are inserted into the metal collars 50.

More specifically, as shown in FIGS. 6, 7 and 11, tubular portions 52 that receive the respective metal collars 50 extend through the base 31a of the plastic plate 31. As shown in FIGS. 3, 5 and 11, the lid 32a of the metal housing 32 includes through holes 53 at the positions corresponding to the tubular portions 52. As shown in FIG. 11, when the guide pulley device 20 is coupled to the support arm of the guide roller unit 6C, the bolts 51, which function as fasteners, are inserted into the metal collars 50 in the direction extending from the metal housing 32 to the plastic plate 31.

As shown in FIG. 8, in the similar manner as the through holes 34 that receive the pins 33a and 33b, the inner surface of each tubular portion 52 includes a plurality of (three in the present embodiment) protrusions 55 that protrude radially inward. The metal collars 50 are pressed into the tubular portions 52 as flattening the protrusions 55. This engages the metal collars 50 with the plastic plate 31.

Furthermore, as shown in FIG. 11, the diameter of the through holes 53 formed in the lid 32a of the metal housing 32 is substantially equal to the inner diameter of the metal collars 50. When the plastic plate 31 and the metal housing 32 are coupled together, the distal ends of the tubular portions 52 are in contact with the lid 32a of the metal housing 32.

Each metal collar 50 has an axial dimension X1 that is greater than the axial dimension X0 of the associated tubular portion 52 (including the thickness of the base 31a). Thus, the plastic plate 31 does not contact the fastening surface of the guide roller unit 6C (upper surface of the support arm 8).

The plastic plate 31, which functions as a first accommodation member, is injection molded such that the base 31a, the two side walls 40a and 40b, the partition walls 42, the hooks 45 (45a to 45d), and the tubular portions 52 are formed integrally. This simplifies the structure and facilitates the assembly.

Operation of the guide pulley device 20 will now be described.

In the present embodiment, after the plastic plate 31 and the metal housing 32 are coupled together to form the receptacle 24, the two cables 21 and 22 are wound around the first and second guide pulleys 23A and 23B accommodated in the receptacle 24.

More specifically, as shown in FIG. 9, the first cable 21 is inserted into the receptacle 24 along the circumferential wall 42g and through the opening 24b that is close to the second guide pulley 23B (the opening on the left side as viewed in FIG. 9). Then, the first cable 21 is inserted into the space between the guide walls 42b and 42c through the connection hole 42h formed in the circumferential wall 42g and then pushed out of this space through the connection hole 42i that is close to the first guide pulley 23A. The first cable 21 then proceeds along the circumferential wall 42f, which includes the connection hole 42i, and extends out of the receptacle 24 through the opening 24a that is close to the first guide pulley 23A (the opening on the right side as viewed in FIG. 9). Accordingly, the grooves G1 of the guide pulleys 23 receive the first cable 21.

In a similar manner, as shown in FIG. 10, the second cable 22 is inserted into the receptacle 24 along the circumferential wall 42g and through the opening 24b that is close to the second guide pulley 23B. Then, the second cable 22 is inserted into the space between the guide walls 42d and 42e through the connection hole 42j formed in the circumferential wall 42g and then pushed out of this space through the connection hole 42k that is close to the first guide pulley 23A. The second cable 22 then proceeds along the circumferential wall 42f, which includes the connection hole 42k, and extends out of the receptacle 24 through the opening 24a that is close to the first guide pulley 23A. Accordingly, the grooves G2 of the guide pulleys 23 receive the second cable 22.

In the guide pulley device 20, insertion of the cables 21 and 22 through the opening 24b, which is one of the two openings 24a and 24b formed in the receptacle 24, allows the inserted ends of the cables 21 and 22 to proceed in the respective routing passages L1 and L2. Then, the cables 21 and 22 are properly wound around the first and second guide pulleys 23A and 23B by pushing the inserted ends out through the other opening 24a.

The above described embodiment achieves the following advantages.

(1) The guide pulley device 20 includes at least one guide pulley 23 and the receptacle 24, which accommodates the guide pulley 23. The guide pulley 23 includes a plurality of (two) grooves G1 and G2, each receiving associated one of the two cables 21 and 22. One of the cables 21 and 22 moves in the winding direction when the other moves in the unwinding direction. The receptacle 24 is formed by coupling the plastic plate 31, which functions as a first accommodation member, to the metal housing 32, which functions as a second accommodation member. The plastic plate 31 includes the base 31a from which the support shafts 30 that support the guide pulleys 23 project. The metal housing 32 includes the lid 32a that faces the base 31a of the plastic plate 31. The plastic plate 31 includes the partition walls 42, which form the routing passages L1 and L2 for the two cables 21 and 22, and hooks 45, which protrude from the partition walls 42 into the grooves G1 and G2 of the guide pulleys 23. The base 31a, the partition walls 42, and the hooks 45 are formed integrally.

The structure described above simplifies the structure of the guide pulley device 20 and reduces the number of components. Further, since the partition walls 42 and the hooks 45 are integrated, the guide pulleys 23 are less likely to interfere with the partition walls 42 and the hooks 45 during assembly. This facilitates the assembly.

(2) The use of the plastic plate 31 as the first accommodation member improves design flexibility and manufacturability. This facilitates formation of the complicated structure in which the base 31a, partitions walls 42, and hooks 45 are integrated. Further, the use of the metal housing 32 as the second accommodation member provides the strength required for the guide pulley device 20.

(3) The guide pulley device 20 includes two guide pulleys 23 (23A and 23B). The partition walls 42 are located between the first guide pulley 23A and the second guide pulley 23B.

In a structure in which two cables 21 and 22, one of which moves in the winding direction when the other moves in the unwinding direction, are wound around two guide pulleys 23, the cables 21 and 22 tend to interfere with each other between the pulleys 23. However, the structure described above effectively prevents interference between the cables 21 and 22.

The partition walls 42 and the hooks 45 are integrated between the two guide pulleys 23. This allows for large space for assembly around the support shafts 30. Thus, during assembly, the guide pulleys 23 are unlikely to interfere with the partition walls 42 and the hooks 45, which further facilitates the assembly.

The partition walls 42 are formed such that the inserted ends of the cables 21 and 22 that are inserted through the opening 24b of the receptacle 24 proceed in the respective routing passages L1 and L2. Thus, the cables 21 and 22 can be wound around the guide pulleys 23 even after the plastic plate 31 and the metal housing 32 are coupled together. This further facilitates the assembly.

(4) The metal collars 50, which receive the bolts 51, are attached to the plastic plate 31. The fastening force of the bolts 51 securely fixes the guide pulley device 20. The metal collars 50 receive the stress generated by the tightening of the bolts 51, preventing deformation of the plastic plate 31. This ensures smooth rotation of the guide pulleys 23 and high reliability.

(5) The metal collars 50 has the axial dimension X1 that allows the plastic plate 31 not to be in contact with the fastening surface of the guide roller unit 6C to which the guide pulley device 20 is fastened. This structure further ensures that the plastic plate 31 is not deformed by the stress.

(6) The base 31a of the plastic plate 31 includes the through holes 34 that receive the pins 33, which function as rivets. The pins 33, which function as the support shafts 30, rotationally support the guide pulleys 23. The through holes 34 are structured such that the inserted pins 33 engage the plastic plate 31.

Such a structure allows the guide pulleys 23 to be coupled to the plastic plate 31 in which the pins 33 project from the base 31a of the plastic plate 31 as the support shafts 30. Further, the semi-assembled guide pulley device 20 can be moved to the site of the next process (e.g., riveting machine) without using a special holder, such as a jig. This further facilitates the assembly.

(7) The hooks 45a to 45d are formed in positions that do not overlap one another in the axial direction of the guide pulleys 23. Thus, in forming the plastic plate 31, a mold of relatively simple structure can be used to integrally form the hooks 45a to 45d, the base 31a, the side walls 40a and 40b, the partition walls 42, and the tubular portion 52, without using a sliding mold.

The above illustrated embodiment may be modified as follows.

In the above embodiment, the guide pulley device 20 includes the first and second guide pulleys 23A and 23B.

However, the guide pulley device 20 may include only one guide pulley 23, provided that the receptacle 24 includes the partition walls 42 that form the routing passages L1 and L2 for the two cables 21 and 22 and the hooks 45 that protrude into the grooves G1 and G2 of the guide pulley 23. For example, the second guide pulley 23B, which is close to the sliding door 3, (and circumferential wall 42g of the partition walls 42) may be removed from the guide pulley device 20 of the above embodiment. Such a structure still has the same advantages of the above embodiment.

In the above embodiment, the two cables 21 and 22 are wound around the first and second guide pulleys 23A and 23B in a figure of six (FIG. 3). However, the cables 21 and 22 may be wound around in a figure of eight. That is, in the guide pulley device 20, the cable 21 may extend diagonally from the side wall 40a to the side wall 40b and intersect the cable 22. Such a structure has the advantages of the first embodiment. Moreover, this structure has the advantage that the second guide pulley 23B, in addition to the first guide pulley 23A, can be formed by one pulley that includes two grooves arranged in tiers.

In the above embodiment, the inner surfaces defining the through holes 34 include a plurality of protrusions 36 that protrude radially inward. The pins 33, which function as rivets, are pressed into the through holes 34 and thus engaged with the plastic plate 31. However, any structure may be employed to achieve engagement between the rivets and the plastic plate 31.

In the above embodiment, the plastic plate 31 is used as the first accommodation member. However, the first accommodation member may be formed of other material. In addition, the second accommodation member may be formed of a material other than metal. Further, the metal collars 50 may be omitted.

In the above embodiment, the guide pulleys 23 each include two grooves G1 and G2. However, as long as the two cables 21 and 22 can be wound separately, the guide pulley may include three or more grooves.

The invention claimed is:

1. A guide pulley device comprising:
a guide pulley including a plurality of grooves, wherein the grooves are configured such that two cables are separately received by the grooves, and one of the cables moves in a winding direction when the other one of the cables moves in an unwinding direction; and
a receptacle that accommodates the guide pulley, wherein
the receptacle includes a first accommodation member and a second accommodation member that are coupled to each other,
the first accommodation member includes a base from which a support shaft that supports the guide pulley projects,
the second accommodation member includes a lid that faces the base,
the first accommodation member includes a partition wall, which forms two routing passages for individually routing the cables, and a plurality of hooks protruding from the partition wall into the grooves, and
the base, the partition wall, and the hooks are formed integrally.

2. The guide pulley device according to claim 1, wherein
the guide pulley is a first guide pulley,
the guide pulley device further includes a second guide pulley, and
the first and second guide pulleys are respectively located on opposite sides of the partition wall.

3. The guide pulley device according to claim 1, wherein
the first accommodation member is made of plastic,
the two routing passages are arranged in an axial direction of the support shaft, and
the hooks are located so as not to overlap one another in an axial direction.

4. The guide pulley device according to claim 1, wherein the first accommodation member is made of plastic, and the second accommodation member is made of metal.

5. The guide pulley device according to claim 4, further comprising a metal tubular member that is attached to the first accommodation member and configured to receive a fastener that fastens the guide pulley device to a fastening subject.

6. The guide pulley device according to claim 5, wherein the tubular member has an axial dimension that allows the first accommodation member not to be in contact with the fastening subject.

7. The guide pulley device according to claim 1, wherein
the support shaft is a rivet that fastens the first and second accommodation members together,
the base includes a through hole into which the rivet is inserted, and
the through hole is configured such that the rivet is engaged with the first accommodation member.

8. A vehicle sliding door system comprising the guide pulley device according to claim 1.

* * * * *